United States Patent [19]

Yamamoto et al.

[11] Patent Number: 4,871,787
[45] Date of Patent: Oct. 3, 1989

[54] FLAME RETARDANT ELECTRICAL INSULATING COMPOSITION HAVING ANTIFUNGAL ACTION

[75] Inventors: Yasuaki Yamamoto; Hiroaki Tsukada; Masami Sorimachi; Akihiro Hori, all of Ibaraki, Japan

[73] Assignee: Hitachi Cable Ltd., Tokyo, Japan

[21] Appl. No.: 209,598

[22] Filed: Jun. 22, 1988

[30] Foreign Application Priority Data

Jun. 23, 1987 [JP] Japan .................. 62-156126
Jan. 19, 1988 [JP] Japan .................... 63-7481

[51] Int. Cl.$^4$ .......................... C08K 5/18; C08K 5/46; C08L 31/04; C08L 31/02
[52] U.S. Cl. ...................... 523/122; 524/84; 524/87; 524/93; 524/258; 524/352; 524/562; 524/563
[58] Field of Search ................ 524/562–563, 524/93, 352, 87, 84, 258; 523/122

[56] References Cited

U.S. PATENT DOCUMENTS

| | | | |
|---|---|---|---|
| 3,936,403 | 2/1976 | Sakaguchi et al. | 524/430 |
| 4,067,847 | 1/1978 | Yui et al. | 524/436 |
| 4,345,046 | 8/1982 | Ejk et al. | 524/399 |
| 4,353,817 | 10/1982 | Nakae et al. | 524/394 |
| 4,477,523 | 10/1984 | Biggs et al. | 524/94 |
| 4,500,665 | 2/1985 | Brecker et al. | 524/394 |
| 4,710,317 | 12/1987 | Tabata et al. | 524/409 |

FOREIGN PATENT DOCUMENTS

| | | | |
|---|---|---|---|
| 0067640 | 4/1982 | Japan | 524/93 |
| 0144345 | 7/1985 | Japan | 524/93 |
| 1213233 | 9/1986 | Japan | 524/93 |

OTHER PUBLICATIONS

Chem Abs. 100-23593t (1984) Hitachi JP58103705 (6-83).

Primary Examiner—Herbert J. Lilling
Attorney, Agent, or Firm—Sughrue, Mion, Zinn, Macpeak & Seas

[57] ABSTRACT

A flame retardant electrical insulating composition having an antifungal action comprises 100 parts by weight of a polyolefin, 50–300 parts by weight of a metal hydroxide, and at least 0.2 parts by weight of an amine compound. Also, a flame retardant electrical insulating composition having an antifungal action comprises 100 parts by weight of an ethylene-vinyl acetate copolymer with a vinyl acetate content of at least 20 wt % or an ethylene-ethyl acrylate copolymer with an ethyl acrylate content of at least 20 wt %, 50–300 parts by weight of a metal hydroxide, at least 0.2 parts by weight of an amine compound, and at least 0.5 parts by weight of a hydroxyl group containing lubricant.

11 Claims, No Drawings

FLAME RETARDANT ELECTRICAL INSULATING COMPOSITION HAVING ANTIFUNGAL ACTION

FIELD OF THE INVENTION

The present invention relates to a flame retardant electrical insulating composition that will not evolve toxic gases as it burns. More particularly, the present invention relates to a flame retardant electrical insulating composition that can inhibit the generation of fungi even when it is used as an insulation or sheath material for electric wires or cables.

BACKGROUND OF THE INVENTION

High-rise buildings, power stations, various industrial plants, vehicles and ships are constantly exposed to fire hazards, so with respect to the wire harnesses installed in these structures, the need has recently arisen to use electric wires and cables that employ insulation or sheath materials that are highly resistant to flame and which will not evolve halide gases, as they burn, that are harmful to humans and capable of causing corrosion of surrounding instruments.

U.S. Pat. No. 4,067,847 describes a flame retardant (self-extinguishing) resin composition prepared by incorporating a metal hydroxide such as magnesium hydroxide, and preferably additional carbon black, into a polyolefin such as polyethylene, polypropylene or a propylene-ethylene copolymer. The metal hydroxide used there will release the water of crystallization by heat of combustion, which fact accelerates the endothermic reaction, to thereby render the resin resistant to flame. By using this flame retardant resin composition as an insulation or sheath material, electric wires or cables having low smoking properties and evolving no toxic gaseous components can be realized. In this respect, the recipe disclosed in U.S. Pat. No. 4,067,847 holds much promise for applications where high flame resistance is required.

On the other hand, electric wires and cables are often laid in poorly ventilated areas such as cable tunnel or ducts or are buried under the ground, and it have recently become apparent that materials containing polyolefins and metal hydroxides as basic components easily suffer from the generation of fungi. The exact mechanism of the generation of fungi has not been fully elucidated but in consideration of the fact that the generation of fungi is negligible when polyolefins are used alone, it can be supposed that the absorption of water or moisture or the surface unevenness caused by the addition of metal hydroxides which relate to implantation of fungi.

There is another problem that is perculiar to those flame retardant electric wires and cables which are especially intended for use in vehicles and ships. It has recently been required to provide them not only with fungus resistance but also with oil resistance comparable to that of neoprene rubber and chlorosulfonated polyethylene in order to ensure satisfactory field performance.

SUMMARY OF THE INVENTION

Accordingly, it is an object of the present invention to provide a flame retardant electrical insulating composition having a superior antifungal action and evolving no harmful halide gases.

Another object of the present invention is to provide a flame retardant electrical insulating composition that not only has superior antifungal action but also exhibits high oil resistance.

These objects of the present invention can be attained by a flame retardant electrical insulating composition comprising 100 parts by weight of a polyolefin, 50–300 parts by weight of a metal hydroxide and at least 0.2 parts by weight of an amine compound.

The present invention has been accomplished on the basis of the finding that the antifungal action of a composition containing a polyolefin and a metal hydroxide as base ingredients can be significantly improved by addition of an amine compound.

DETAILED DESCRIPTION OF THE PREFERRED EMBODIMENTS

Examples of the polyolefin that can be used in the present invention include polyethylene, polypropylene, an ethylene-vinyl acetate copolymer, an ethylene-ehtyl acrylate copolymer, ethylene-propylene rubber, and an ethylene-butene copolymer.

If an ethylene-vinyl acetate copolymer or an ethylene-ethyl acrylate copolymer are to be used, the content of vinyl acetate or ethylene acrylate is usually limited to be within the range of 10–20 wt% in consideration of such factors as heat resistance, mechanical strength and moldability. However, in applications where high oil resistance is required, ethylene-vinyl acetate copolymers with a vinyl acetate content of at least 20 wt% or ethylene-ethyl acrylate copolymers with an ethyl acrylate content of at least 20 wt% are preferably used. If the content of vinyl acetate or ethyl acrylate is increased, the extruding processability of the resin is greatly reduced on account of sticking during processing such as roll mixing or twin-screw mixing. In order to avoid this problem, the use of a lubricant is preferred if the content of vinyl acetate or ethyl acrylate exceeds 20 wt%. The present inventors have confirmed by experimentation that the use of hydroxyl group containing lubricants are most effective for this purpose.

The metal hydroxids that are suitable for use in the present invention have an average particle size of 0.1–30 $\mu$m, preferably 0.5–15 $\mu$m. If a metal hydroxide to be used has been surface-treated with a suitable compound such as a fatty acid, a metal salt of a fatty acid, a silane compound or a titanate compound, it will be dispersed in the polyolefin sufficiently uniformly to produce a composition that has an improved processability in such operations as extrusion molding. Specific examples of such metal hydroxides include aluminum hydroxide, magnesium hydroxide, basic magnesium carbonate, calcium hydroxide or hydrotalcite. The amount of the metal hydroxide to be incorporated must be in the range of 50–300 parts by weight per 100 parts by weight of the polyolefin. If this amount is less than 50 parts by weight, the desired flame resistance will not be imparted. If this amount exceeds 300 parts by weight, reduction in extruding processability and mechanical strength will be brought about.

The amine compound to be used in the present invention is a compound having at least one hydrogen atom in ammonia ($NH_3$) replaced by hydrocarbon group R, and there are three kinds of amines, that is, $RNH_2$, $R_2NH$ and $R_3N$. The present inventors have confirmed by experimentation that improved antifungal action can be imparted by addition of this amine compound. Other compounds such as phenolic compounds are little effective in imparting the desired antifungal action.

Specific examples of the amine compound that can be used in the present invention include: phenyl-β-naphthylamine; bis(phenyl-isopropylidene)-4,4'-diphenylamine; N,N'-diphenyl-p-phenylenediamine; N-isopropyl-N'-phenyl-p-phenylenediamine; a polymer of 2,2,4-trimethyl-1,2-dihydroquinoline; 2,5-di-tert-butylhydroquinone; 2-mercaptobenzimidazole; and 2-mercaptomethyl-benzimidazole.

The amount of the amine compound to be incorporated must be at least 0.2 parts by weight per 100 parts by weight of the polyolefin. If this amount is less than 0.2 parts by weight, the desired antifungal action will not be attained. While there is no particular upper limit for this content, about 20 parts by weight could be given as a guide figure.

In addition to the essential ingredients described above, the composition of the present invention may optionally contain carbon black, lubricants, antioxidants, softening agents and dispersants.

Carbon black has the ability to provide further improved flame resistance by accelerating carbonization during combustion. Carbon black is preferably added in an amount of at least 0.5 parts by weight per 100 parts by weight of the polyolefin.

As already mentioned, a hydroxyl group containing lubricant is an advantageous one. Specific examples of such hydroxyl group containing lubricants are hydroxyl group containing fatty acids or metal salts thereof typified by such compounds as hydroxystearic acid, ricinoleic acid, abarium hydroxystearate, calcium hydroxystearate, calcium hydroxylaurate, lithium hydroxystearate, barium ricinoleate and calcium ricinoleate. The hydroxyl group containing lubricant is preferably added in an amount of at least 0.5 parts by weight per 100 parts by weight of the polyolefin.

The resin composition of the present invention may or may not be crosslinkable. If it is to be cross-linkable, organic peroxides typified by dicumyl peroxide and 3-bis(tert-butylperoxyisopropyl)benzene can advantageously be used as curing agents. Such curing agents may be used in combination with curing assistants such as sulfur, ethylene dimethacrylate, diallyl phthalate and p-quinone dioxime. Crosslinking of the composition can also be accomplished by irradiation with electron beams and, in such case, generally, reactive monomers such as trimethylol propane trimellitate and triallyl isocyanurate are added as curing assistants.

The following examples are provided for the purpose of further illustrating the present invention but are in no way to be construed as limiting.

EXAMPLES 1-7 AND COMPARATIVE EXAMPLES 1-5

The ingredients listed in the recipes shown under Examples 1-7 and Comparative Examples 1-5 were kneaded with 6-in rolls at 100°-120° C., to thereby prepare the compounds.

Using a 40-mm extruder (L/D=25), the compounds were extrusion-coated in a thickness of 1 mm on the outer surfaces of copper wires (o.d.=2 mm), to thereby produce insulated electric wires. The compound prepared in Example 7 was crosslinked by holding in steam (13 kg/cm$^2$) for 3 minutes after the extrusion coating.

In another run, the compounds prepared from the components shown under Examples 1-6 and Comparative Examples 1-5 were formed into sheets 1 mm thick with a hot press (80 tons) at a temperature of 170° C. under a pressure of 100 kg/cm$^2$. The compound prepared in Example 7 was performed at 120° C. and thereafter crosslinked by pressing at 180° C. for 10 minutes, to be formed into a sheet.

The results of evaluations conducted on the respective samples for their flame resistance, tensile characteristics and antifungal action are shown in Table 1. The criteria for the evaluations were as follows.

Flame resistance

According to JIS C 3004, an insulated electric wire held horizontally was burned with a burner, and the burner was removed. The sample was rated "acceptable" if the flame extinguished within 1 minute, and rated "not acceptable" if it continued to burn for more than 1 minute.

Tensile characteristics

The copper wire was drawn out of an insulated electric wire. The remaining coat was left to stand in a thermostatic room for 1 day at 20° C., and subjected to a tensile test by stretching it at a speed of 500 mm/min with a Schopper tensile tester.

Fungus resistance

A sheet was cut into a square test piece (50×50 mm) and fungi was cultivated for 2 weeks on this test piece in accordance with a wet method of JIS Z 2911 for Textiles. The results of observation of the generation of fungi were evaluated by the following criteria (A) to (C): (A), no growth of fungi; (B), the growth of fungi covered no more than a third of the area of the test piece; and (C), the growth of fungi covered more than a third of the area of the test piece.

EXAMPLE 1

| | |
|---|---|
| Low-density polyethylene (density = 0.916; melt index = 1.0 at 190° C.) | 100 parts by weight |
| Aluminum hydroxide (treated with stearic acid; average particle size, 1 μm) | 80 parts by weight |
| Stearic acid | 1 part by weight |
| N,N'—Diphenyl-p-phenylenediamine | 1 part by weight |

EXAMPLE 2

| | |
|---|---|
| Low-density polyethylene density = 0.916; melt index = 1.0 at 190° C.) | 100 parts by weight |
| Aluminum hydroxide (treated with stearic acid; average particle size, 1 μm) | 120 parts by weight |
| Stearic acid | 1 part by weight |
| N,N'—Diphenyl-p-phenylenediamine | 1 part by weight |

EXAMPLE 3

| | |
|---|---|
| Low-density polyethylene (density = 0.916; melt index = 1.0 at 190° C.) | 100 parts by weight |
| Magnesium hydroxide (treated with oleic acid; average particle size, 1 μm) | 70 parts by weight |
| Stearic acid | 1 part by weight |
| N,N'—Diphenyl-p-phenylenediamine | 3 parts by weight |

COMPARATIVE EXAMPLE 1

| | |
|---|---|
| Low-density polyethylene (density = 0.916; melt index = 1.0 at 190° C.) | 100 parts by weight |
| Aluminum hydroxide (treated with stearic acid; average particle size, 1 μm) | 10 parts by weight |
| Stearic acid | 1 part by weight |
| N,N'—Diphenyl-p-phenylenediamine | 1 part by weight |

COMPARATIVE EXAMPLE 2

| | |
|---|---|
| Low-density polyethylene (density = 0.916; melt index = 1.0 at 190° C.) | 100 parts by weight |
| Aluminum hydroxide (treated with stearic acid; average particle size, 1 μm) | 80 parts by weight |
| Stearic acid | 1 part by weight |
| Tetrakis[methylene-3-(3',5'-di-tert-butyl-4'-hydroxyphenyl)propionate]methane | 1 part by weight |

EXAMPLE 4

| | |
|---|---|
| Ethylene-vinyl acetate copolymer (vinyl acetate content, 15 wt %; melt index = 1.5 at 190° C.) | 100 parts by weight |
| Magnesium hydroxide (treated with oleic acid; average particle size, 1 μm) | 100 parts by weight |
| Stearic acid | 1 part by weight |
| 2,2,4-Trimethyl-1,2-dihydroquinoline polymer | 5 parts by weight |

EXAMPLE 5

| | |
|---|---|
| Ethylene-vinyl acetate copolymer (vinyl acetate content, 15 wt %; melt index = 1.5 at 190° C.) | 100 parts by weight |
| Magnesium hydroxide (treated with oleic acid; average particle size, 1 μm) | 130 parts by weight |
| Stearic acid | 1 part by weight |
| 2,5-Di-tert-butylhydroquinone | 2 parts by weight |

COMPARATIVE EXAMPLE 3

| | |
|---|---|
| Ethylene-vinyl acetate copolymer (vinyl acetate content, 15 wt %; melt index = 1.5 at 190° C.) | 100 parts by weight |
| Aluminum hydroxide (treated with stearic acid; average particle size, 1 μm) | 400 parts by weight |
| Stearic acid | 1 part by weight |
| 2,2,4-Trimethyl-1,2-dihydroquinoline polymer | 5 parts by weight |

COMPARATIVE EXAMPLE 4

| | |
|---|---|
| Ethylene-vinyl acetate copolymer (vinyl acetate content, 15 wt %; melt index = 1.5 at 190° C.) | 100 parts by weight |
| Magnesium hydroxide (treated with oleic acid; average particle size, 1 μm) | 100 parts by weight |
| Stearic acid | 1 part by weight |
| 4,4'-Thio-bis(6-tert-butyl-4-methylphenol) | 2 parts by weight |

EXAMPLE 6

| | |
|---|---|
| Ethylene-vinyl acrylate copolymer (ethyl acrylate content, 17 wt %; melt index = 1.0 at 190° C.) | 100 parts by weight |
| Aluminum hydroxide (treated with stearic acid; average particle size, 1 μm) | 90 parts by weight |
| Stearic acid | 1 part by weight |
| 2,5-Di-tert-butylhydroquinone | 3 parts by weight |

COMPARATIVE EXAMPLE 5

| | |
|---|---|
| Ethylene-ethyl acrylate copolymer (ethyl acrylate content, 17 wt %; melt index = 1.0 at 190° C.) | 100 parts by weight |
| Magnesium hydroxide (treated with oleic acid; average particle size, 1 μm) | 100 parts by weight |
| Stearic acid | 1 part by weight |
| 2-Mercaptobenzimidazole | 0.05 parts by weight |

EXAMPLE 7

| | |
|---|---|
| Ethylene-propylene rubber (Mooney viscosity $ML_{1+4}$ = 35 at 100° C.; ethylene content = 70 mol %; iodine value = 15) | 100 parts by weight |
| Magnesium hydroxide (treated with oleic acid; average particle size, 1 μm) | 110 parts by weight |
| Dicumyl peroxide | 3 parts by weight |
| Stearic acid | 1 part by weight |
| 2-Mercaptobenzimidazole | 2 parts by weight |

The samples prepared in Examples 1–7 according to the present invention had high flame resistance and good tensile characteristics while permitting no growth of fungi even after 2 weeks of cultivation. The sample prepared in Comparative Example 1 contained less than 50 parts by weight of a metal hydroxide and thus exhibited insufficient flame resistance. The samples prepared in Comparative Examples 2 and 4 used phenolic compounds instead of amine compounds, so they were unable to inhibit the growth of fungi. The sample prepared in Comparative Example 3 contained more than 300 parts by weight of a metal hydroxide and were very poor in tensile characteristics. The samples prepared in Comparative Example 5 contained less than 0.2 parts by weight of an amine compound and thus was unable to inhibit the growth of fungi.

TABLE 1

| | | Tensile Characteristics | | |
|---|---|---|---|---|
| No. | Flame Resistance (JIS C 3004) | tensile strength (kg/mm$^2$) | elongation (%) | Fungus Resistance (JIS Z 2911) |
| Example | | | | |
| 1 | acceptable | 1.41 | 570 | (A) |
| 2 | acceptable | 1.12 | 560 | (A) |

TABLE 1-continued

| No. | Flame Resistance (JIS C 3004) | Tensile Characteristics | | Fungus Resistance (JIS Z 2911) |
|---|---|---|---|---|
| | | tensile strength (kg/mm$^2$) | elongation (%) | |
| 3 | acceptable | 1.48 | 580 | (A) |
| 4 | acceptable | 1.23 | 550 | (A) |
| 5 | acceptable | 1.02 | 540 | (A) |
| 6 | acceptable | 1.29 | 590 | (A) |
| 7 | acceptable | 0.95 | 450 | (A) |
| Comparative Example | | | | |
| 1 | not acceptable | 1.78 | 600 | (A) |
| 2 | acceptable | 1.40 | 560 | (C) |
| 3 | acceptable | 0.13 | 50> | (A) |
| 4 | acceptable | 1.25 | 560 | (C) |
| 5 | acceptable | 1.09 | 560 | (C) |

EXAMPLES 8–11, COMPARATIVE EXAMPLE 6 AND REFERENCE EXAMPLES 1 AND 2

The ingredients listed in the recipes shown under Examples 8–11, Comparative Example 6 and Reference Examples 1 and 2 were kneaded with 6-in rolls at 100° C., to thereby prepare compounds.

Polyethylene was extrusion-coated in a thickness of 1 mm over copper wires (o.d., 3 mm) and crosslinked to form insulated conductors. Three of such insulated conductors were stranded together into a core, which was extrusion-coated with each of the compounds in a thickness of 2 mm using a 40-mm extruder (L/D=25). The compound coatings were crosslinked by holding them in steam (15 kg/cm$^2$) for 3 minutes, to produce electric cables.

In another run, the compounds prepared from the components shown under Examples 8–11, Comparative Example 6, and Reference Examples 1 and 2 were, after preforming at 100° C., press-cured at 180° C. for 10 minutes, to form sheets.

The results of evaluations conducted on the respective samples for their roll processability, flame resistance, tensile characteristics, oil resistance and antifungal action are summarized in Table 2. The criteria for the evaluations were as follows.

Roll processability

The rolled compound was cut twice, that is, 3 and 5 minutes after the start of roll-mixing, to check for the occurrence of sticking to the rolls.

Flame resistance

Eight electric cables arranged vertically were subjected to a tray flame test described in IEEE Standard 383 and those which did not burn out entirely were rated "acceptable".

Tensile characteristics

The core was drown out of each electric cable, and the remaining coat was abraded to a thickness of 1 mm, died out with JIS dumbbell No. 3, left to stand in a thermostatic room for 1 day at 20° C., and then subjected to a tensile test by stretching it at a speed of 500 mm/min with a Schopper tensile tester.

Oil resistance

The core was drawn out of each electric cable, and the remaining coat was immersed in an insulating oil (ASTM #2 oil) for 18 hours at 120° C. in accordance with the standards of chloroprene rubber for electric appliances, removed from the oil, left to stand in a thermostatic room for 1 day at 20° C., and then subjected to a tensile test.

Fungus resistance

A sheet was cut into a square test piece (50×50 mm) and fungi were cultivated for 2 weeks on this test piece in accordance with a wet method of JIS Z 2911 for textiles. The results of observation of the growth of fungi were evaluated by the following criteria: (A), no growth of fungi; (B), the growth of fungi covered no more than a third of the area of the test piece; and (C), the growth of fungi covered more than a third of the area of the test piece.

EXAMPLE 8

| | |
|---|---|
| Ethylene-vinyl acetate copolymer (vinyl acetate content, 40 wt %; melt index = 2.0 at 190° C.) | 100 parts by weight |
| Magnesium hydroxide (treated with oleic acid; average particle size, 1 μm) | 100 parts by weight |
| Dicumyl peroxide | 3 parts by weight |
| 2-Mercaptobenzimidazole | 2 parts by weight |
| FEF Carbon black | 5 parts by weight |
| Hydroxystearic acid | 1 part by weight |

COMPARATIVE EXAMPLE 6

| | |
|---|---|
| Ethylene-vinyl acetate copolymer (vinyl acetate content, 40 wt %; melt index = 2.0 at 190° C.) | 100 parts by weight |
| Magnesium hydroxide (treated with oleic acid; average particle size, 1 μm) | 100 parts by weight |
| Dicumyl peroxide | 3 parts by weight |
| 4,4'-Thio-bis(6-tert-butyl-4-methylphenol) | 2 parts by weight |
| FEF Carbon black | 5 parts by weight |
| Hydroxystearic acid | 1 part by weight |

REFERENCE EXAMPLE 1

| | |
|---|---|
| Ethylene-viny acetate copolymer (vinyl acetate content, 15 wt %; melt index = 0.8 at 190° C.) | 100 parts by weight |
| Magnesium hydroxide (treated with oleic acid; average particle size, 1 μm) | 100 parts by weight |
| Dicumyl peroxide | 3 parts by weight |
| 2-Mercaptobenzimidazole | 2 parts by weight |
| FEF Carbon black | 5 parts by weight |
| Hydroxystearic acid | 1 part by weight |

REFERENCE EXAMPLE 2

| | |
|---|---|
| Ethylene-vinyl acetate copolymer (vinyl acetate content, 40 wt %; melt index = 2.0 at 190° C.) | 100 parts by weight |
| Magnesium hydroxide (treated with oleic | 100 parts by |

| | |
|---|---|
| acid; average particle size, 1 μm) | |
| Dicumyl peroxide | 3 parts by weight |
| 2-Mercaptobenzimidazole | 2 parts by weight |
| FEF Carbon black | 5 parts by weight |
| Stearic acid | 2 parts by weight |

| | |
|---|---|
| Dicumyl peroxide | 3 parts by weight |
| 2-Mercaptobenzimidazole | 2 parts by weight |
| FEF Carbon black | 10 parts by weight |
| Calcium hydroxystearate | 2 parts by weight |

TABLE 2

| | | | Tensile Characteristics | | Oil Resistance | | |
|---|---|---|---|---|---|---|---|
| No. | Roll Processability | Flame Resistance (IEEE 383) | tensile strength ($kg/mm^2$) | elongation (%) | residual tensile strength (%) | residual elongation (%) | Fungi Resistance (JIS Z 2911) |
| Example | | | | | | | |
| 8 | good | acceptable | 1.52 | 510 | 86 | 83 | (A) |
| 9 | good | acceptable | 1.10 | 480 | 93 | 85 | (A) |
| 10 | good | acceptable | 1.18 | 510 | 81 | 73 | (A) |
| 11 | good | acceptable | 1.05 | 480 | 86 | 78 | (A) |
| Comparative Example | | | | | | | |
| 6 | good | acceptable | 1.51 | 500 | 85 | 83 | (C) |
| Reference Example | | | | | | | |
| 1 | good | acceptable | 1.13 | 530 | 41 | 73 | (A) |
| 2 | sticking occurred | acceptable | 1.29 | 460 | 91 | 84 | (A) |

EXAMPLE 9

| | |
|---|---|
| Ethylene-vinyl acetate copolymer (vinyl acetate content, 45 wt %; melt index = 2.0 at 190° C.) | 100 parts by weight |
| Aluminum hydroxide (treated with stearic acid; average particle size, 1 μm) | 150 parts by weight |
| Dicumyl peroxide | 3 parts by weight |
| 2-Mercaptobenzimidazole | 2 parts by weight |
| FEF Carbon black | 5 parts by weight |
| Calcium hydroxystearate | 2 parts by weight |

EXAMPLE 10

| | |
|---|---|
| Ethylene-ethyl acrylate copolymer (ethyl acrylate content, 25 wt %; melt index = 5.0 at 190° C.) | 100 parts by weight |
| Magnesium hydroxide (treated with oleic acid; average particle size, 1 μm) | 110 parts by weight |
| Dicumyl peroxide | 3 parts by weight |
| 2-Mercaptobenzimidazole | 2 parts by weight |
| FEF Carbon black | 5 parts by weight |
| Lithium hydroxystearate | 3 parts by weight |

EXAMPLE 11

| | |
|---|---|
| Ethylene-ethyl acrylate copolymer (ethyl acrylate content, 30 wt %; melt index = 5.0 at 190° C.) | 100 parts by weight |
| Magnesium hydroxide (treated with oleic acid; average particle size, 1 μm) | 120 parts by weight |

The samples prepared in Examples 8-11 according to the present invention were satisfactory with respect to all roll processability, tensile characteristics, oil resistance, flame resistance and antifungal action. The sample prepared in Comparative Example 6 employed a phenolic compound instead of an amine compound and was unable to inhibit the growth of fungi. The sample prepared in Reference Example 1 employed an ethylene-vinyl acetate copolymer with a vinyl acetate content of no more than 20 wt%; the oil resistance of this sample was apparently low. The sample prepared in Reference Example 2 used a lubricant containing no hydroxyl group and was poor in roll processability.

As will be understood from the foregoing description, the present invention provides a flame retardant electrical insulating composition that exhibits superior antifungal action without evolving any toxic halide gases. The present invention also provides a flame retardant electrical insulating composition that exhibits high oil resistance in addition to the good antifungal action.

While the invention has been described in detail and with reference to specific embodiments thereof, it will be apparent to one skilled in the art that various changes and modifications can be made therein without departing from the spirit and scope thereof.

What is claimed is:

1. A flame retardant electrical insulating composition having an antifungal action, which comprises 100 parts by weight of an ethylene-vinyl acetate copolymer with a vinyl acetate content of at least 20 wt% or an ethylene-ethyl acrylate copolymer with an ethyl acrylate content of at least 20 wt%, 50-300 parts by weight of a metal hydroxide, at least 0.2 parts by weight of an amine compound, and at least 0.5 parts by weight of a hydroxyl group containing lubricant.

2. A flame retardant electrical insulating composition having an antifungal action according to claim 1, wherein the hydroxyl group containing lubricant is hydroxystearic acid.

3. A flame retardant electrical insulating composition having an antifungal action according to claim 1, wherein the hydroxyl group containing lubricant is calcium hydroxystearate.

4. A flame retardant electrical insulating composition having an antifungal action according to claim 1, wherein the hydroxyl group containing lubricant is lithium hydroxystearate.

5. A flame retardant electrical insulating composition having an antifungal action according to claim 1, which further contains at least 0.5 parts by weight of carbon black.

6. A flame retardant electrical insulating composition having an antifungal action according to claim 1, wherein the metal hydroxide is aluminum hydroxide.

7. A flame retardant electrical insulating composition having an antifungal action according to claim 1, wherein the metal hydroxide is magnesium hydroxide.

8. A flame retardant electrical insulating composition having an antifungal action according to claim 1, wherein the amine compound is N,N'-diphenyl-p-phenylenediamine.

9. A flame retardant electrical insulating composition having an antifungal action according to claim 1, wherein the amine compound is a polymer of 2,2,4-trimethyl-1,2-dihydroquinoline.

10. A flame retardant electrical insulating composition having an antifungal action according to claim 1, wherein the amine compound is 2-mercaptobenzimidazole.

11. A flame retardant electrical insulating composition having an antifungal action according to claim 1, wherein the amine compound is 2,5-di-tert-butylhydroquinone.

* * * * *